Figure 1:
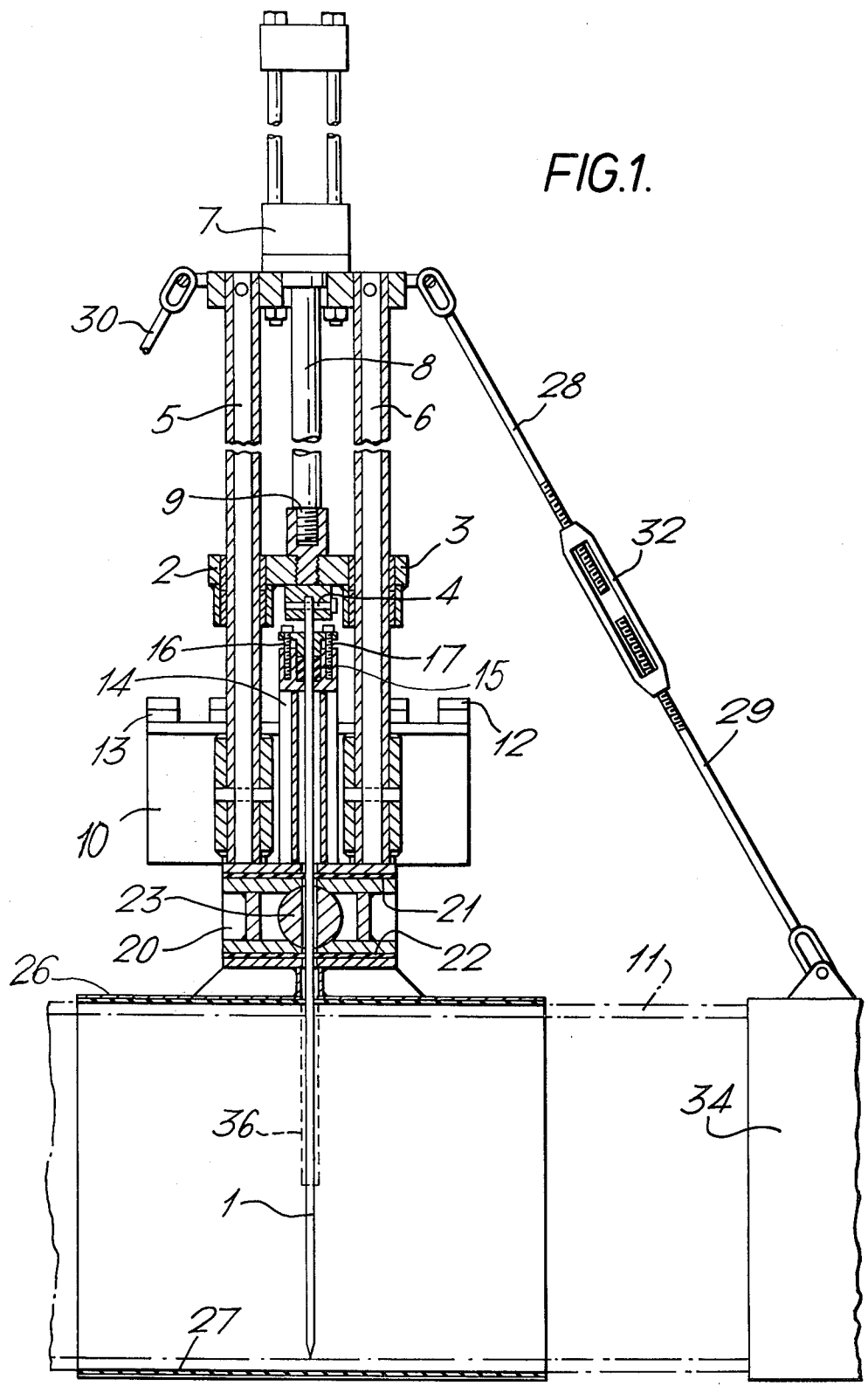

United States Patent [19]

Carruthers

[11] 4,119,115

[45] Oct. 10, 1978

[54] STOPPING FLUID FLOW IN PIPES

[75] Inventor: Alec Reginald Carruthers, Newcastle, England

[73] Assignee: British Gas Corporation, London, England

[21] Appl. No.: 779,488

[22] Filed: Mar. 21, 1977

[30] Foreign Application Priority Data

Mar. 19, 1976 [GB] United Kingdom ............... 11094/76

[51] Int. Cl.² ............................................. F16K 43/00
[52] U.S. Cl. ..................................... 137/318; 83/54;
137/322; 138/94; 138/94.3
[58] Field of Search ..................... 83/54; 137/318, 319,
137/320, 321, 322; 138/94, 94.3, 99; 285/197,
198, 199

[56] References Cited

U.S. PATENT DOCUMENTS

| 463,524 | 11/1891 | Madden | 137/318 |
|---|---|---|---|
| 578,418 | 3/1897 | Payne | 137/318 |
| 3,319,661 | 5/1967 | Shindler | 138/94.3 |
| 3,532,113 | 10/1970 | McKean | 137/318 |
| 3,716,068 | 2/1973 | Addison | 137/318 |
| 3,833,020 | 9/1974 | Smith | 137/318 |
| 3,863,667 | 2/1975 | Ward | 137/318 |
| 3,865,129 | 2/1975 | Peterson | 137/318 |
| 3,905,718 | 9/1975 | Luckenbill et al. | 137/318 |

FOREIGN PATENT DOCUMENTS

| 550,605 | 12/1957 | Canada | 137/319 |
|---|---|---|---|
| 656,476 | 1/1963 | Canada | 285/199 |
| 1,000,907 | 2/1952 | France | 137/318 |
| 1,447,919 | 6/1966 | France | 285/197 |
| 2,142,283 | 1/1973 | France | 137/318 |
| 19,012 of | 1910 | United Kingdom | 137/318 |

*Primary Examiner*—Martin P. Schwadron
*Assistant Examiner*—G. L. Walton
*Attorney, Agent, or Firm*—Larson, Taylor and Hinds

[57] ABSTRACT

An apparatus for cutting into and stopping the flow of fluid in a plastic pipe including a cutting blade that is forced downwardly into a pipe by a hydraulic force. The blade is slightly larger than the internal diameter of the pipe and thus when located within the pipe stops the flow of fluid in the pipe. The apparatus is constructed so that the cutting, flow stopping and the consequential withdrawal of the blade operation is carried out without loss of fluid from the pipe. Part of the apparatus is left on the pipe and encapsulated to complete the operation.

5 Claims, 2 Drawing Figures

STOPPING FLUID FLOW IN PIPES

This invention relates to apparatus used for stopping the flow of fluids within a plastic pipe.

From time to time it is necessary to stop the flow of gas along a pipe for such reasons as emergency shutdown or routine maintenance. A 'stopping off' operation could either be at one place in a pipe or complete insolation of a section of the pipe in cases where a T-piece may be inserted in the pipe. There are other times when the flow of gas in the pipe needs to be stopped quickly such as emergency and it is necessary for the 'stopping off' apparatus to be swift and effective.

Present methods of stopping the flow along the pipe consist of a 'squeeze off' method where the pipe is hydraulically squeezed between two externally applied rollers. This method although very simple and effective on small diameter and relatively new polyethylene pipe, creates high stresses across the diameter of the pipe at the squeezed areas. Problems may occur in the stressed parts of the plastic and this could be a limitation of this method.

Another method is using an inflatable bag or ball. These systems are limited to smaller sizes of pipe. They require a split collar and a drilled hole for entering the pipeline. After drilling, the drill is removed through an isolating valve, and the stopper inserted into the hold. The disadvantages of this second method is the time factor in putting this method into operation and also the need for an isolating valve.

The object of the invention is to provide an apparatus which is less susceptible to the above disadvantages.

According to the invention, there is provided an apparatus for cutting and stopping the flow of fluid along a plastic pipe comprising a cutting member movable by a forcing means and supported by a support means, a first sealing member engaging on the cutting member, the support means being fixed to a second sealing member which is attached to a first clamp which surrounds part of a pipe, both sealing members adapted in use to allow the cutting member to pass through, and at least one further clamping means positioned on either side of the first clamping means longitudinally along the pipe, and attached to the support means.

The first sealing means should be a non-closable type of sealing means which runs against the cutting blade and therefore, preferably the first sealing means should be a stuffing box.

The sealing member which is situated above the first clamp should be a valve and this can be a flap valve or a spool valve or any other method of closure which is effective, but preferably cheap.

To avoid unnecessary force on the blade it is preferable that the blade is coated with a non-friction material such as "teflon", (Registered Trade Mark).

The forcing means to provide force on to the blade can be any forcing means but preferably a hydraulic system is used.

Preferably, the cutting means, guide members, and the forcing means can be detached from the spool valve and split 'U'-shaped collar so that after use the spool valve can be capped off.

Figure 2:
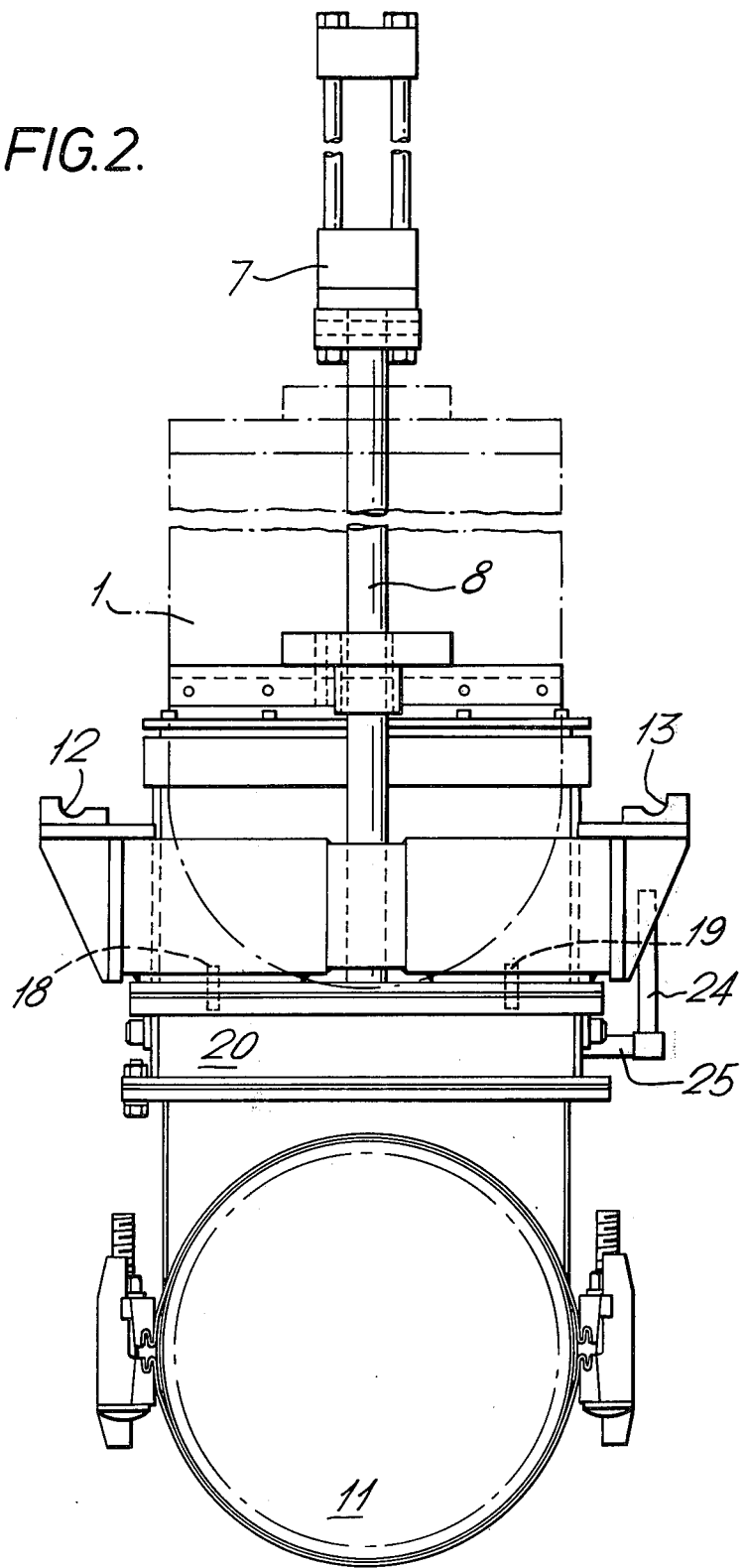

To enable the invention to be more clearly understood and solely by way of example, one embodiment, in accordance with the invention will be described with reference to the following drawings which are:

FIG. 1 shows a side sectional elevation of the apparatus mounted on a plastic pipe, and, FIG. 2 shows a front elevation of the apparatus mounted upon a plastic pipe.

The apparatus comprises, a cutting blade 1 mounted upon two runners 2 and 3 by means of a screw 4. The runners move along guide-rails 5 and 6 which support a forcing means 7 which drives a piston 8 which is connected by a screw means 9 to the runners 2 and 3. Connected to the guide-rails 5 and 6 is a clamping means 10 which can be anchored to the pipe 11 by a chain (not shown) located in the brackets 12 and 13 and being wrapped around the pipe 11. Located between the guide-rails 5 and 6 is a further housing which comprises a body 14 provided with a stuffing box sealing means 15 anchored to the body by two screws 16 and 17. The part of the apparatus which comprises the cutting blade 1, the guide-rails 5 and 6, the forcing means 7 and piston 8, the stuffing box 15 and the clamping means 10 will hereinafter be called the upper part of the apparatus. The upper part of the apparatus is located with a lower part of the apparatus by two pins 18 and 19, which are located in the upper surface of the spool valve 20. The spool valve 20 comprises of two rubber sealing members 21 and 22 and a spool closure means 23. The spool can be rotated by a handle 24 having a shaft 25 connected to the spool 23. Fixed to the spool valve 20 is a 'U' shaped clamp 26 having a rubber inner sealing member 27 which is in contact with the external surface of the pipe 11 to form a gas tight seal. For further support of the apparatus torsion bars 28, 29, 30 are connected to the upper part of the apparatus and are tensioned by screw means 32. The torsion bars are fixed to clamps 34 on either side laterally along the pipe.

In use of the apparatus, the 'U'-shaped clamp 26 is placed around the pipe 11 thus positioning the spool valve 20 upon the pipe 11. The upper part of the apparatus is placed upon the lower part by locating the upper part by its pins 18 and 19 into the lower part. The 'U' shaped clamps 34 are positioned either side of the apparatus along the pipe and the torsion bars 28, 29, 30 are fixed and tensioned by use of the screw means 32 and 33. A chain (not shown) is placed in the clamps 12 and 13 and anchored around the pipe 11 so that the upper part of the apparatus is anchored securely to the lower part. The spool valve 20 is opened so that the slot in the spool 23 is actually in line with the cuttng blade 1. The cutting blade 1, at this moment in time, is retracted into the upper part of the upper apparatus. The forcing means 7 is actuated so that the cutting member is passed through the sealing plate 21, through the slot in the spool 23 and finally through the sealing plate 22 and continues to pass into the pipe cutting through the wall until it locates at the point which is diametrically opposite the point of entry of the cutting blade into the pipe. The blade has a diameter which is slightly more than the internal diameter of the plastic pipe and thus any flow of fluid along the pipe is cut off. A slot 36 is manufactured into the bottom 'U' shaped clamp 26 below the spool valve to enable the cutting blade 1 to have a path through the plastic pipe 11.

After any repairs have been carried out to the pipe and it is now necessary for the flow of fluid to recommence the blade can be withdrawn up through the spool valve into the upper part of the apparatus which will still maintain a no-gas condition. The spool valve 20 can be closed to isolate the upper part of the apparatus from the lower part and by either anchoring the chain from around the pipe and the torsion bars the upper part of the apparatus can be removed from the lower part. To complete the operation the spool valve and 'U'-shaped clamp 26 are encapsulated thus forming a complete seal around the pipe.

We claim:

1. An apparatus for cutting into and stopping the flow of fluid in a plastic pipe comprising a clamp located around the pipe in a fluid tight manner, a valve mounted onto the clamp, a support member removably mounted upon the valve and having guide rails, a carriage adapted to move along said guide rails, a cutting blade having a semicircular cutting edge attached to and movable with the carriage, actuating means for moving the carriage and blade along the rails, a sealing member mounted between the carriage and the valve and adapted so that the blade, in use, passes therethrough, and clamping means for securely clamping the apparatus onto the pipe, said blade being movable through the sealing member and the valve and through the upper part of the pipe wall into the interior of the pipe the diameter of said cutting edge of said blade being slightly larger than the internal diameter of said pipe such that the blade penetrates only partially into the lower part of the pipe wall and cuts off any flow of fluid therein, and upon withdrawal of the blade from the pipe, flow is restored without loss of gas to the atmosphere.

2. An apparatus according to claim 1, wherein the sealing member comprises a stuffing box.

3. An apparatus according to claim 1, wherein the valve comprises a spool valve.

4. An apparatus according to claim 1, wherein the blade is coated with a non-friction material.

5. An apparatus according to claim 1, wherein the actuating means is energized by a hydraulic means.

* * * * *